US010122468B2

(12) United States Patent
Yoshida (10) Patent No.: US 10,122,468 B2
(45) Date of Patent: Nov. 6, 2018

(54) OPTICAL RELAYING APPARATUS, OPTICAL TRANSMISSION SYSTEM, AND OPTICAL-SIGNAL REPRODUCING AND RELAYING METHOD

(71) Applicant: Mitsubishi Electric Corporation, Tokyo (JP)

(72) Inventor: Tsuyoshi Yoshida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/741,851

(22) PCT Filed: Nov. 24, 2015

(86) PCT No.: PCT/JP2015/082886
§ 371 (c)(1),
(2) Date: Jan. 4, 2018

(87) PCT Pub. No.: WO2017/090082
PCT Pub. Date: Jun. 1, 2017

(65) Prior Publication Data
US 2018/0219632 A1    Aug. 2, 2018

(51) Int. Cl.
*H04J 14/06* (2006.01)
*H04B 10/516* (2013.01)
(Continued)

(52) U.S. Cl.
CPC ....... *H04B 10/5161* (2013.01); *H04B 10/541* (2013.01); *H04B 10/5561* (2013.01);
(Continued)

(58) Field of Classification Search
CPC .............. H04B 10/5161; H04B 10/612; H04B 10/614; H04B 10/613; H04B 10/541;
(Continued)

(56) References Cited

U.S. PATENT DOCUMENTS 6,046,833 A    4/2000  Sharma et al.
8,873,950 B2   10/2014 Akasaka
(Continued)

FOREIGN PATENT DOCUMENTS

JP    2002-510441 A    4/2002
JP    2013-81168 A     5/2013
(Continued)

OTHER PUBLICATIONS

Optical Internetworking Forum. "100G Ultra Long Haul DWDM Framework Document." http://www.oiforum.com. 10 pages.
(Continued)

*Primary Examiner* — Don N Vo
(74) *Attorney, Agent, or Firm* — Birch, Stewart, Kolasch & Birch, LLP (57) ABSTRACT

An optical relay apparatus includes a first signal converting unit that converts a received optical signal into an electric signal and demodulates and outputs the electric signal and modulates an input electric signal in a first modulation scheme, converts the electric signal into an optical signal, and transmits the optical signal and a second signal converting unit that modulates the electric signal output from the first signal converting unit in a second modulation scheme, converts the electric signal into an optical signal, and transmits the optical signal and converts a received optical signal into an electric signal, demodulates the electric signal, and outputs the electric signal as an electric signal input to the first signal converting unit.

7 Claims, 6 Drawing Sheets

(51) Int. Cl.
*H04B 10/556* (2013.01)
*H04B 10/54* (2013.01)
*H04B 10/61* (2013.01)
*H04B 10/40* (2013.01)

(52) U.S. Cl.
CPC ......... *H04B 10/612* (2013.01); *H04B 10/613* (2013.01); *H04B 10/614* (2013.01); *H04J 14/06* (2013.01); *H04B 10/40* (2013.01); *H04B 10/616* (2013.01)

(58) Field of Classification Search
CPC .. H04B 10/5561; H04B 10/40; H04B 10/616; H04J 14/06
USPC .......................................................... 398/65
See application file for complete search history.

(56) References Cited

U.S. PATENT DOCUMENTS

| | | | |
|---|---|---|---|
| 8,964,581 B2 | 2/2015 | Takara et al. | |
| 2006/0045054 A1* | 3/2006 | Utsumi | H04B 10/25754 370/338 |
| 2009/0226163 A1* | 9/2009 | Sugahara | H04B 10/032 398/17 |
| 2014/0226981 A1 | 8/2014 | Kuwabara | |
| 2017/0244165 A1* | 8/2017 | Ghelfi | H01Q 1/246 |

FOREIGN PATENT DOCUMENTS

| | | |
|---|---|---|
| JP | 2013-183371 A | 9/2013 |
| JP | 2014-158069 A | 8/2014 |
| JP | 2015-119437 A | 6/2015 |
| JP | 2015-171083 A | 9/2015 |
| JP | 2016-52106 A | 4/2016 |
| WO | WO 2011/030897 A1 | 3/2011 |

OTHER PUBLICATIONS

Yamazaki et al. "Fast optical channel recovery in field demonstration of 100-Gbit/s Ethernet over OTN using real-time DSP." Optics Express, vol. 19, No. 14, pp. 13179-13184.

* cited by examiner

OPTICAL RELAYING APPARATUS, OPTICAL TRANSMISSION SYSTEM, AND OPTICAL-SIGNAL REPRODUCING AND RELAYING METHOD

FIELD

The present invention relates to an optical relaying apparatus, an optical transmission system, and an optical-signal reproducing and relaying method for reproducing and relaying an optical signal.

BACKGROUND

To perform long-distance large-capacity transmission with an optical fiber, realization of high-density signal multiplexing, measures against signal power-to-noise power ratio deterioration due to optical amplitude, and measures against waveform distortion due to a fiber non-linear optical effect are problems.

As a technique for realizing large-capacity transmission, there is a method of increasing a transmission capacity per optical fiber by changing a modulation scheme in use to a modulation scheme with a large modulation multi-level number. There is also a method of increasing a transmission capacity by carrying different kinds of information on a plurality of optical carrier waves or optical sub-carrier waves and performing high-density wavelength multiplexing.

As a modulation scheme used in an optical transmission system, on off keying (OOK) for allocating binary signals to presence and absence of light and transmitting one bit per one symbol has been used. However, it is possible to increase a transmission capacity by using quaternary phase-shift keying (QPSK) or hexadecimal quadrature amplitude modulation (QAM) to increase the number of signal points and increase the number of transmission bits per one symbol.

There is known a scheme for increasing the number of transmission bits per one symbol to a double by using a polarization multiplexing scheme. In the polarization multiplexing scheme, signals are independently allocated to orthogonal two polarization components (vertical polarization and horizontal polarization).

For demodulation of an OOK signal, a direct detection scheme for detecting presence or absence of an optical signal and identifying the optical signal on a reception side has been used. For demodulation of a differential binary phase-shift keying (DBPSK) signal, a differential QPSK (DQPSK) signal, and the like, a scheme for, after delaying an optical signal and causing the optical signal to interfere, directly detecting the optical signal, that is, an optical-delay detecting scheme has been used. Most of signals transmitted using the polarization multiplexing scheme are demodulated using a digital coherent scheme for compensating, with digital signal processing, an electric signal obtained by performing coherent detection for mixing a local oscillation light source and a reception signal and causing the local oscillation light source and the reception signal to interfere to detect the local oscillation light source and the reception signal at a reception end. In the digital coherent scheme, a polarization multiplexing QPSK scheme is widely used (see, for example, Non Patent Literatures 1 and 2).

When a transmission capacity of an optical transmission system is expanded by multi-valuing of a modulation scheme, that is, by changing a modulation scheme in use to a scheme with a large modulation multi-level number, there is a problem in that a transmission distance is sometimes limited according to the multi-valuing of the modulation scheme. As measures against this problem, it has been examined to optimize a format of a wavelength multiplexed signal according to a transmission path of an optical signal and a combination of transmission paths (e.g., Patent Literature 1).

In a system for transmitting a large-capacity signal in a long distance, in a state in which signal quality cannot be kept at a specified value or more, optical signal reproduction and relay for once terminating an optical signal and converting the optical signal into an electric signal, converting the electric signal into an optical signal again, and transmitting the optical signal is performed (e.g., Patent Literature 2).

CITATION LIST

Patent Literature

Patent Literature 1: WO 2011/030897
Patent Literature 2: Japanese Patent Application Laid-Open No. 2013-81168

Non Patent Literature

Non Patent Literature 1: Optical Internetworking Forum, "100G Ultra Long Haul DWDM Framework Document", June 2009
Non Patent Literature 2: E. Yamazaki, other 27 people, "Fast optical channel recovery in field demonstration of 100-Gbit/s Ethernet (registered trademark) over OTN using real-time DSP", Optics Express, Jul. 4, 2011, vol. 19, no. 14, pp. 13179-13184.

SUMMARY

Technical Problem

As explained above, it is possible to maintain signal quality and extend a transmission distance by performing the reproduction and relay for once converting an optical signal into an electric signal, converting the electric signal into an optical signal again, and transmitting the optical signal. The conventional reproduction and relay has an object of, when the quality of an optical signal is deteriorated, resetting the optical signal to an original signal waveform. However, in an optical network, an optimum modulation scheme is sometimes different for each of transmission sections. For example, when a first section in which a transmission distance can be short but optical transmission having an extremely large capacity is requested and a second section in which a capacity can be relatively small but long-distance optical transmission is requested are mixed, it is considered desirable to use a different modulation scheme for each of the sections. That is, in the first section, because a transmission capacity is prioritized over a transmission distance, it is desirable to use a modulation scheme with a large modulation multi-level number. In the second section, because a transmission distance is prioritized over a transmission capacity, it is desirable to use a modulation scheme with a small modulation multi-level number.

In conventional reproduction and relay of an optical signal such as reproduction and relay performed by a network apparatus described in Patent Literature 2, a received optical signal is reset to an original signal waveform, that is, a waveform at the time when the optical signal is output from a transmission source apparatus of the optical signal. Therefore, when the conventional reproduction and relay is applied, different modulation cannot be used for each of transmission sections.

The present invention has been devised in view of the above, and an object of the present invention is to obtain an optical relay apparatus capable of changing a modulation scheme when an optical signal is reproduced and relayed.

Solution to Problem

In order to solve the aforementioned problem and achieve the object, an optical relay apparatus according to the present invention includes: a first signal converting unit to convert a received optical signal into an electric signal, demodulate and output the electric signal, and modulate an input electric signal in a first modulation scheme and convert the electric signal into an optical signal and transmit the optical signal; and a second signal converting unit to modulate the electric signal output from the first signal converting unit in a second modulation scheme and convert the electric signal into an optical signal and transmit the optical signal, and convert a received optical signal into an electric signal, demodulate the electric signal, and output the electric signal as an electric signal input to the first signal converting unit.

Advantageous Effects of Invention

The optical relay apparatus according to the present invention achieves an effect that it is possible to change a modulation scheme when an optical signal is reproduced and relayed.

DESCRIPTION OF EMBODIMENTS

An optical relay apparatus, an optical transmission system, and an optical-signal reproducing and relaying method according to an embodiment of the present invention are explained in detail below with reference to the drawings. Note that the present invention is not limited by the embodiment.

Embodiment

Figure 1:
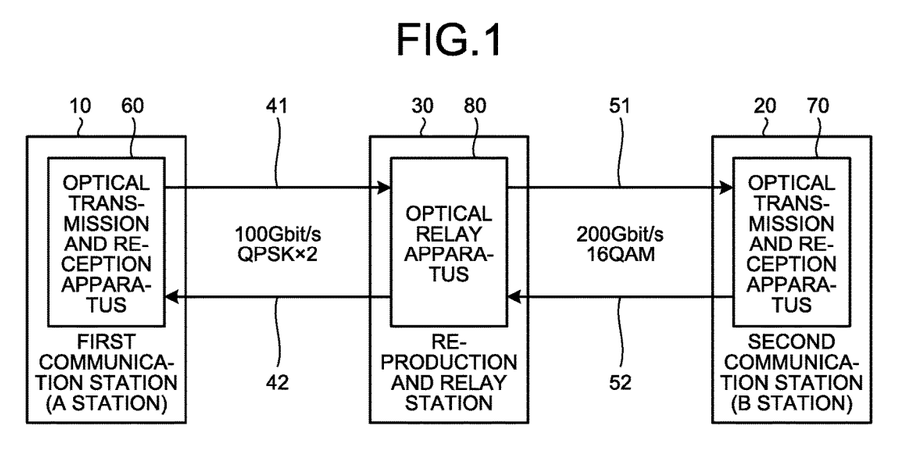
FIG. 1 is a diagram showing a configuration example of an optical transmission system applied with an optical relay apparatus according to an embodiment.

FIG. 1 is a diagram showing a configuration example of an optical transmission system applied with an optical relay apparatus according to this embodiment. The optical transmission system includes a first communication station 10 that transmits and receives an optical signal of 100 Gbit/s, a second communication station 20 that transmits and receives an optical signal of 200 Gbit/s, and a reproduction and relay station 30 that reproduces and relays, to the second communication station 20, the optical signal transmitted from the first communication station 10 and reproduces and relays, to the first communication station 10, the optical signal transmitted from the second communication station 20.

The first communication station 10 includes an optical transmission and reception apparatus 60. The second communication station 20 includes an optical transmission and reception apparatus 70. The reproduction and relay station 30 includes an optical relay apparatus 80, which is an optical relay apparatus according to the present invention. The optical transmission and reception apparatus 60 of the first communication station 10 and the optical relay apparatus 80 of the reproduction and relay station 30 are connected by transmitting units 41 and 42. The optical relay apparatus 80 of the reproduction and relay station 30 and the optical transmission and reception apparatus 70 of the second communication station 20 are connected by transmitting units 51 and 52. The transmitting units 41, 42, 51, and 52 are realized by, for example, an optical fiber functioning as a transmission line. The transmitting units 41, 42, 51, and 52 can include, besides the optical fiber, an optical multiplexing and demultiplexing device configured by a wavelength selective switch (WSS), an arrayed waveguide grating (AWG), an interleaver, an optical coupler, and the like, an optical amplifier for loss compensation, and an optical fiber for wavelength dispersion compensation.

Figure 2:
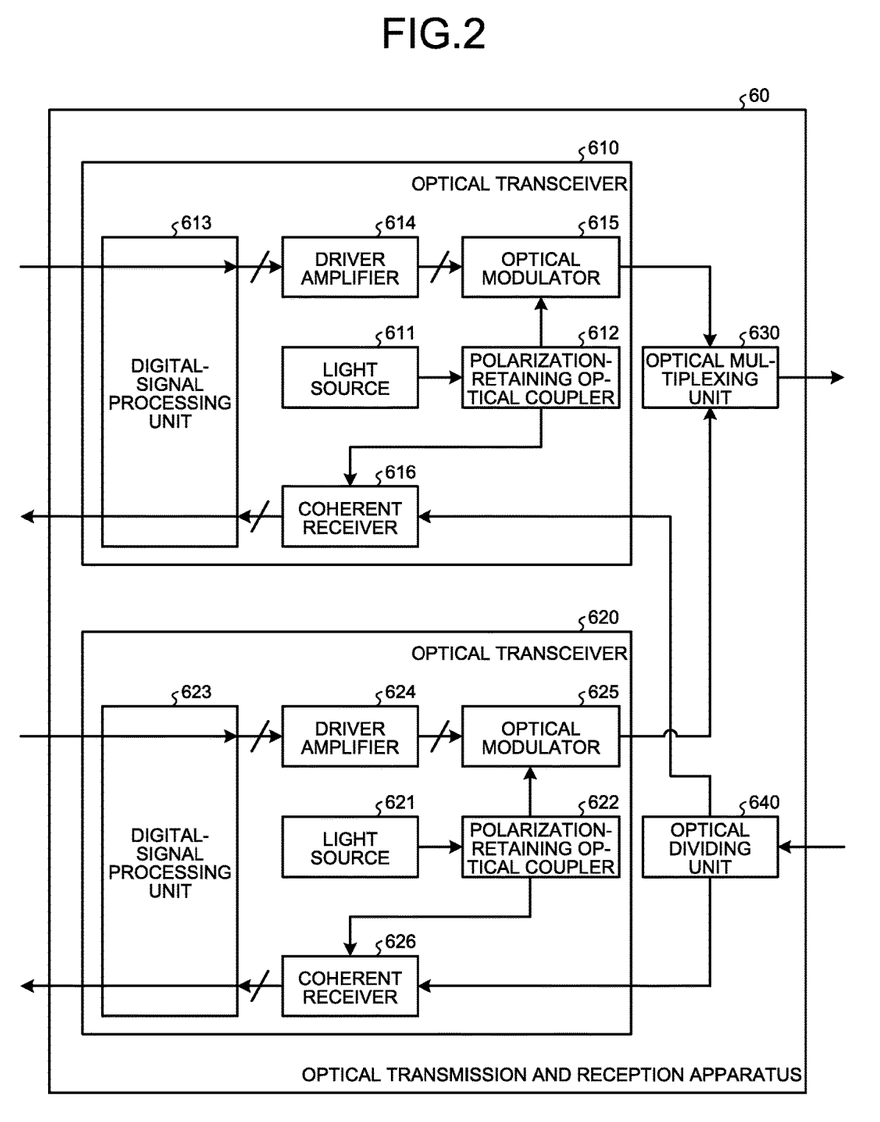
FIG. 2 is a diagram showing a configuration example of an optical transmission and reception apparatus included in a first communication station according to the embodiment.

FIG. 2 is a diagram showing a configuration example of the optical transmission and reception apparatus 60 included in the first communication station 10. The optical transmission and reception apparatus 60 includes optical transceivers 610 and 620 that convert an input optical signal into an electric signal and demodulate and output the electric signal and modulate an input electric signal, convert the electric signal into an optical signal, and output the optical signal, an optical multiplexing unit 630 that multiplexes the optical signals respectively output from the optical transceivers 610 and 620 and outputs the optical signals to the outside, that is, the transmitting unit 41 shown in FIG. 1, and an optical dividing unit 640 that divides an optical signal input from the outside, that is, the transmitting unit 42 shown in FIG. 1 and inputs the optical signal to the optical transceivers 610 and 620.

The optical transceiver 610 includes a light source 611 that emits non-modulated light, a polarization-retaining optical coupler 612 that divides light input from the light source 611 into two, a digital-signal processing unit 613 that executes digital signal processing including modulation processing and demodulation processing on an input electric signal, a driver amplifier 614 that amplifies an input signal, an optical modulator 615 that modulates input non-modulated light, and a coherent receiver 616 that performs coherent detection on input modulated light. The optical transceiver 620 includes a light source 621 that emits non-modulated light, a polarization-retaining optical coupler 622 that divides input light into two, a digital-signal processing unit 623 that executes digital signal processing including modulation processing and demodulation processing on an input electric signal, a driver amplifier 624 that amplifies an input signal, an optical modulator 625 that modulates input non-modulated light, and a coherent receiver 626 that performs coherent detection on input modulated light.

Figure 3:
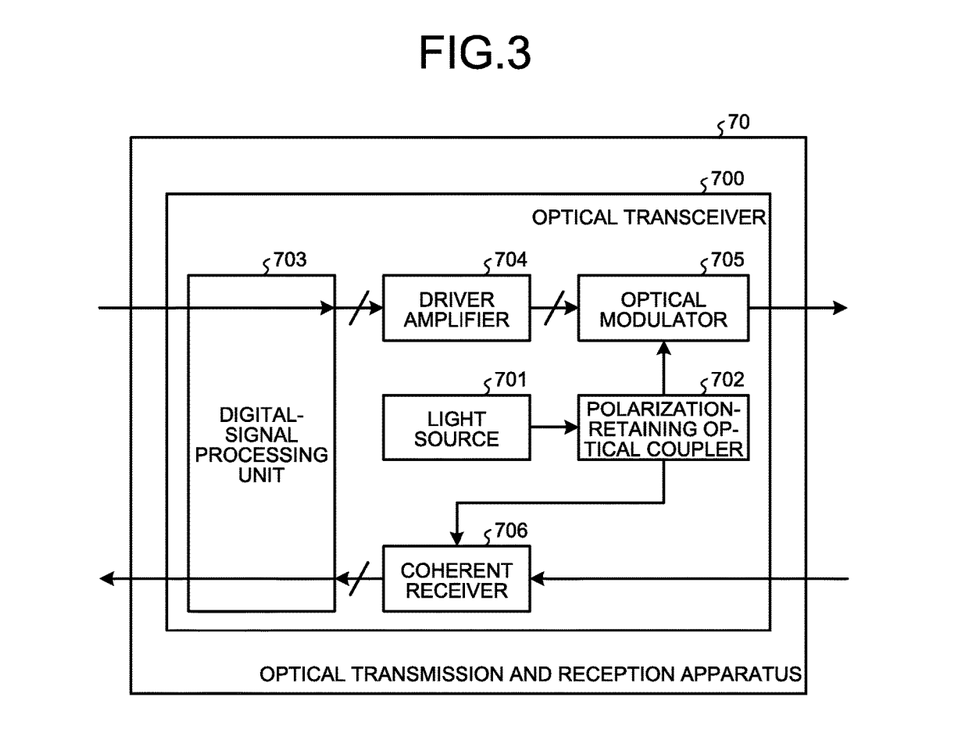
FIG. 3 is a diagram showing a configuration example of an optical transmission and reception apparatus included in a second communication station according to the embodiment.

FIG. 3 is a diagram showing a configuration example of the optical transmission and reception apparatus 70 included in the second communication station 20. The optical transmission and reception apparatus 70 includes an optical transceiver 700 that converts an input optical signal into an electric signal and demodulates and outputs the electric signal and modulates an input electric signal, converts the electric signal into an optical signal, and outputs the optical signal.

The optical transceiver 700 includes a light source 701 that emits non-modulated light, a polarization-retaining optical coupler 702 that divides input light into two, a digital-signal processing unit 703 that executes digital signal processing including modulation processing and demodulation processing on an input electric signal, a driver amplifier 704 that amplifies an input signal, an optical modulator 705 that modulates input non-modulated light, and a coherent receiver 706 that performs coherent detection on input modulated light.

Figure 4:
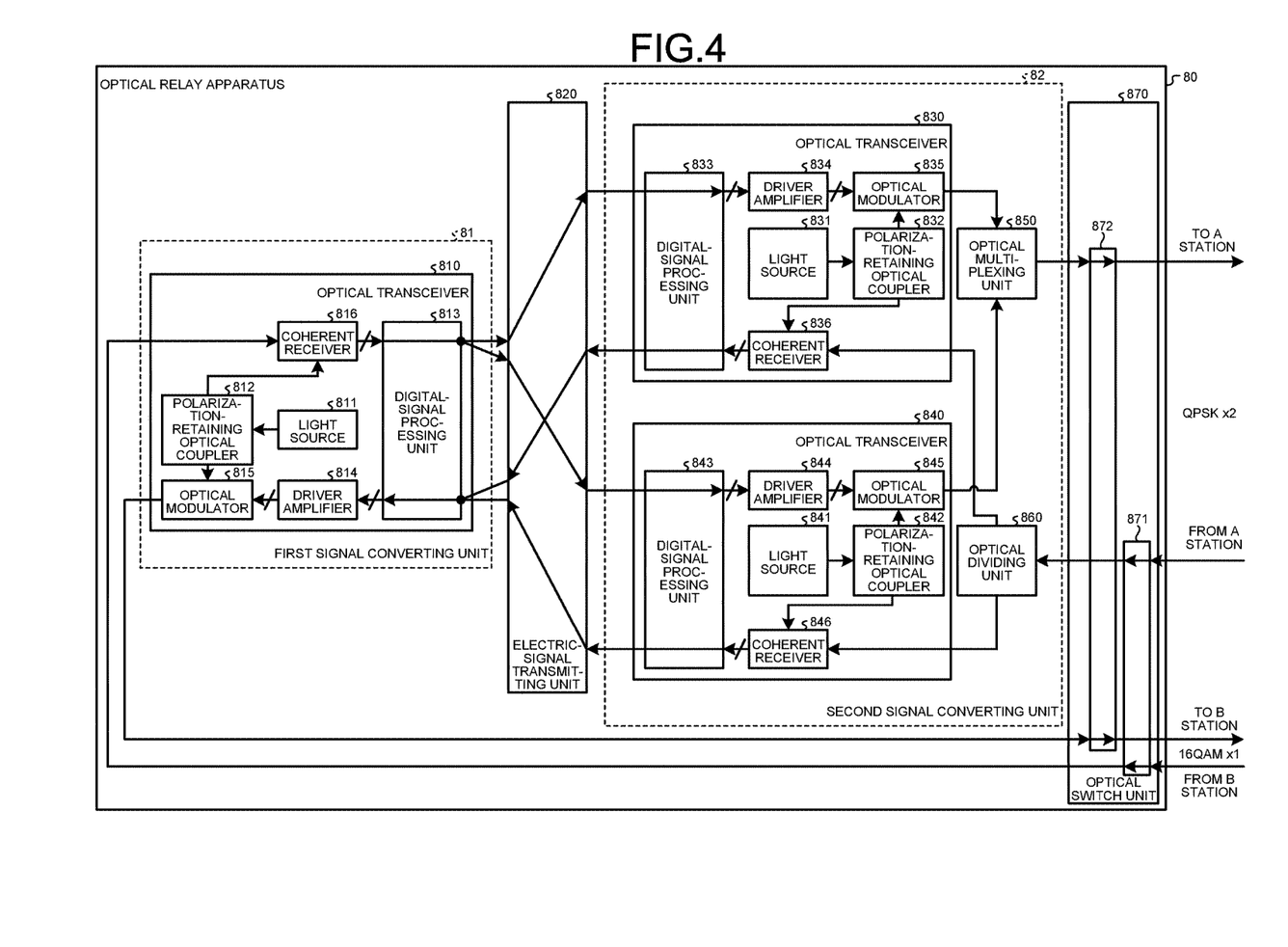
FIG. 4 is a diagram showing a configuration example of an optical relay apparatus included in a reproduction and relay station according to the embodiment.

FIG. 4 is a diagram showing a configuration example of the optical relay apparatus 80 included in the reproduction and relay station 30.

The optical relay apparatus 80 includes a first signal converting unit 81 that converts an input optical signal into an electric signal and demodulates and outputs the electric signal and modulates an input electric signal in a first modulation scheme, converts the electric signal into an optical signal, and outputs the optical signal and a second signal converting unit 82 that modulates the electric signal output from the first signal converting unit 81 in a second modulation scheme, converts the electric signal into an optical signal, and outputs the optical signal and converts the input optical signal into an electric signal, demodulates the electric signal, and outputs the electric signal as an electric signal input to the first signal converting unit 81.

The optical relay apparatus 80 includes an electric-signal transmitting unit 820 that inputs the electric signal output from the first signal converting unit 81 to the second signal converting unit 82 and inputs the electric signal output from the second signal converting unit 82 to the first signal converting unit 81.

The optical relay apparatus 80 includes an optical switch unit 870 that executes first switch processing for inputting the optical signal output from the first communication station 10 to the first signal converting unit 81 and outputting the optical signal output from the first signal converting unit 81 toward the first communication station 10 and inputting the optical signal output from the second communication station 20 to the second signal converting unit 82 and outputting the optical signal output from the second signal converting unit 82 toward the second communication station 20 or second switch processing for inputting the optical signal output from the second communication station 20 to the first signal converting unit 81 and outputting the optical signal output from the first signal converting unit 81 toward the second communication station 20 and inputting the optical signal output from the first communication station 10 to the second signal converting unit 82 and outputting the optical signal output from the second signal converting unit 82 toward the first communication station 10.

The optical switch unit 870 is configured by a sub-switch 871 that switches a transmission destination of the optical signal output from each of the first signal converting unit 81 and the second signal converting unit 82 and a sub-switch 872 that switches an input destination of the optical signal transmitted from each of the first communication station 10 and the second communication station 20 shown in FIG. 1.

The first signal converting unit 81 includes an optical transceiver 810. The second signal converting unit 82 includes optical transceivers 830 and 840, an optical multiplexing unit 850 that multiplexes an optical signal output from each of the optical transceivers 830 and 840 and outputs the optical signal to the outside, that is, the optical switch unit 870, and an optical dividing unit 860 that divides an optical signal input from the outside, that is, the optical switch unit 870 and inputs the optical signal to the optical transceivers 830 and 840.

The optical transceiver 810 of the first signal converting unit 81 includes a light source 811 that emits non-modulated light, a polarization-retaining optical coupler 812 that divides input light into two, a digital-signal processing unit 813 that executes digital signal processing including modulation processing and demodulation processing on an input electric signal, a driver amplifier 814 that amplifies an input signal, an optical modulator 815 that modulates input non-modulated light, and a coherent receiver 816 that performs coherent detection on input modulated light.

The optical transceiver 830 of the second signal converting unit 82 includes a light source 831 that emits non-modulated light, a polarization-retaining optical coupler 832 that divides input light into two, a digital-signal processing unit 833 that executes digital signal processing including modulation processing and demodulation processing on an input electric signal, a driver amplifier 834 that amplifies an input signal, an optical modulator 835 that modulates input non-modulated light, and a coherent receiver 836 that performs coherent detection on input modulated light. The optical transceiver 840 of the second signal converting unit 82 includes a light source 841 that emits non-modulated light, a polarization-retaining optical coupler 842 that divides input light into two, a digital-signal processing unit 843 that executes digital signal processing including modulation processing and demodulation processing on an input electric signal, a driver amplifier 844 that amplifies an input signal, an optical modulator 845 that modulates input non-modulated light, and a coherent receiver 846 that performs coherent detection on input modulated light.

The light sources 611 and 621 included in the optical transmission and reception apparatus 60 shown in FIG. 2, the light source 701 included in the optical transmission and reception apparatus 70 shown in FIG. 3, and the light sources 811, 831, and 841 included in the optical relay apparatus 80 shown in FIG. 4 can be realized by, for example, a semiconductor laser.

The polarization-retaining optical couplers 612 and 622 included in the optical transmission and reception apparatus 60 shown in FIG. 2, the polarization-retaining optical coupler 702 included in the optical transmission and reception apparatus 70 shown in FIG. 3, and the polarization-retaining optical couplers 812, 832, and 842 included in the optical relay apparatus 80 shown in FIG. 4 are, for example, optical couplers of a polarization retaining type and can be realized by a 1-to-2 optical coupler, a power ratio of which is 1:1.

The digital-signal processing units 613 and 623 included in the optical transmission and reception apparatus 60 shown in FIG. 2, a digital-signal processing unit 703 included in the optical transmission and reception apparatus 70 shown in FIG. 3, and the digital-signal processing units 813, 833, and 843 included in the optical relay apparatus 80 shown in FIG. 4 can be realized by, for example, an encoder, a decoder, a modem, a framer, a deframer, and a filter.

The driver amplifiers 614 and 624 included in the optical transmission and reception apparatus 60 shown in FIG. 2, the driver amplifier 704 included in the optical transmission and reception apparatus 70 shown in FIG. 3, the driver amplifiers 814, 834, and 844 included in the optical relay apparatus 80 shown in FIG. 4 can be realized by, for example, an amplifier circuit.

The optical modulators 615 and 625 included in the optical transmission and reception apparatus 60 shown in FIG. 2, the optical modulator 705 included in the optical transmission and reception apparatus 70 shown in FIG. 3, and the optical modulators 815, 835, and 845 included in the optical relay apparatus 80 shown in FIG. 4 can be realized by, for example, a polarization multiplexing I/Q optical modulator.

The coherent receivers 616 and 626 included in the optical transmission and reception apparatus 60 shown in FIG. 2, the coherent receiver 706 included in the optical transmission and reception apparatus 70 shown in FIG. 3, and the coherent receivers 816, 836, and 846 included in the optical relay apparatus 80 shown in FIG. 4 can be realized by, for example, a polarization diversity-type integrated coherent receiver.

The optical multiplexing unit 630 included in the optical transmission and reception apparatus 60 shown in FIG. 2 and the optical multiplexing unit 850 included in the optical relay apparatus 80 shown in FIG. 4 can be realized by, for example, a 2-to-1 optical coupler, a power ratio of which is 1:1.

The optical dividing unit 640 included in the optical transmission and reception apparatus 60 shown in FIG. 2 and the optical dividing unit 860 included in the optical relay apparatus 80 shown in FIG. 4 can be realized by, for example, a 1-to-2 optical coupler, a power ratio of which is 1:1.

The electric-signal transmitting unit 820 included in the optical relay apparatus 80 shown in FIG. 4 can be realized by, for example, a switch circuit.

The sub-switches 871 and 872 of the optical switch unit 870 included in the optical relay apparatus 80 shown in FIG. 4 can be realized by an optical switch.

The operation of the optical transmission system shown in FIG. 1 is explained. As an example, operation performed when a polarization multiplexing QPSK optical signal is transmitted between the first communication station 10 and the reproduction and relay station 30 and a polarization multiplexing 16QAM optical signal is transmitted between the reproduction and relay station 30 and the second communication station 20 is explained. Note that, in the following explanation, for convenience, the first communication station 10 is sometimes referred to as "A station" and the second communication station is sometimes referred to as "B station".

(Optical Signal Transmitting Operation from the First Communication Station 10 to the Second Communication Station 20)

First, an optical signal transmitting operation from the first communication station 10 to the second communication station 20 is explained with reference to FIG. 1 to FIG. 4.

In the optical transceiver 610 inside the optical transmission and reception apparatus 60 configuring the A station, which is the first communication station 10, shown in FIG. 1, that is, the optical transmission and reception apparatus 60 having the configuration shown in FIG. 2, the light source 611 generates non-modulated light and outputs the non-modulated light to the polarization-retaining optical coupler 612. The light source 611 emits light at a wavelength conforming to a flexible grid of a C band or an L band specified by, for example, the ITU-T (International Telecommunication Union-Telecommunication Standardization Sector). The polarization-retaining optical coupler 612 divides the non-modulated light input from the light source 611 into two and outputs the non-modulated light to the optical modulator 615 and the coherent receiver 616. The digital-signal processing unit 613 performs digital signal processing, specifically, OTU4 (Optical channel Transport Unit Level 4) framing, error correction encoding, mapping processing for generating a polarization multiplexing QPSK signal, and the like on a client signal of 100 GbE (Gigabit Ethernet) or the like input from a not-shown outside. The OTU4 frame is a type of an OTU frame specified in the ITU-T G. 709. In the error correction encoding, the digital-signal processing unit 613 performs encoding using, for example, a low-density parity check code having a redundancy degree of 20% or more. In this case, a reception side performs soft decision decoding. The digital-signal processing unit 613 outputs an electric signal obtained by executing the digital signal processing on the client signal to the driver amplifier 614. The driver amplifier 614 amplifies the electric signal input from the digital-signal processing unit 613 and outputs the electric signal to the optical modulator 615. The optical modulator 615 modulates the non-modulated light input from the polarization-retaining optical coupler 612 with the electric signal input from the driver amplifier 614 and outputs the non-modulated light to the optical multiplexing unit 630 as an optical signal transmitted to the B station, which is the second communication station 20.

The optical transceiver 620 inside the optical transmission and reception apparatus 60 generates, in the same procedure as the procedure in the optical transceiver 610, an optical signal transmitted to the second communication station 20 and outputs the optical signal to the optical multiplexing unit 630. However, the optical transceiver 620 generates an optical signal having a wavelength different from the wavelength of the optical signal generated by the optical transceiver 610. That is, the light source 611 of the optical transceiver 610 and the light source 621 of the optical transceiver 620 generate non-modulated lights having wavelengths different from each other. A difference between an oscillation frequency of the light source 611 and an oscillation frequency of the light source 621 is set to, for example, approximately 37.5 gigahertz.

The optical multiplexing unit 630 multiplexes the optical signal input from each of the optical transceivers 610 and 620 and outputs the optical signal to the outside, that is, the transmitting unit 41.

The transmitting unit 41 transmits the optical signal output from the optical multiplexing unit 630 of the optical transmission and reception apparatus 60 included in the A station to the optical relay apparatus 80 in the reproduction and relay station 30. In the optical relay apparatus 80 having the configuration shown in FIG. 4, an optical signal transmitted from the A station through the transmitting unit 41 is input to the sub-switch 871 of the optical switch 870.

In the optical relay apparatus 80, the sub-switch 871 of the optical switch unit 870 performs route selection for the optical signal input from the A station through the transmitting unit 41 and outputs the optical signal to the optical dividing unit 860. The optical dividing unit 860 divides the optical signal of the A station input from the optical switch unit 870 and outputs the optical signal to the coherent receiver 836 of the optical transceiver 830 and the coherent receiver 846 of the optical transceiver 840.

In the optical transceiver 830, the light source 831 generates non-modulated light and outputs the non-modulated light to the polarization-retaining optical coupler 832. The light source 831 emits light, for example, at a wavelength conforming to the flexible grid of the C band or the L band. Note that a wavelength of the non-modulated light generated by the light source 831 is set to a wavelength substantially coinciding with a wavelength of the non-modulated light generated by the light source 611 of the optical transceiver 610 or a wavelength of the non-modulated light generated by the light source 621 of the optical transceiver 620 shown in FIG. 2. The polarization-retaining optical coupler 832 divides the non-modulated light output from the light source 831 and outputs the non-modulated light to the optical modulator 835 and the coherent receiver 836. The coherent receiver 836 causes the optical signal input from the optical dividing unit 860 to interfere with the non-modulated light input from the polarization-retaining optical coupler 832, performs coherent detection, and outputs an electric signal obtained by the coherent detection to the digital-signal processing unit 833. The digital-signal processing unit 833 performs digital signal processing on the electric signal input from the coherent receiver 836, compensates for distortion and the like included in a received signal, for example, wavelength dispersion, polarization fluctuation, polarization mode dispersion, carrier wave frequency offset, and carrier wave phase fluctuation, performs error correction decoding, and further deframes an OTU4 frame. The digital-signal processing unit 833 outputs the electric signal of 100 Gbit/s subjected to the digital signal processing to the electric-signal transmitting unit 820.

In the optical transceiver 840, the light source 841 generates non-modulated light and outputs the non-modulated light to the polarization-retaining optical coupler 842. The light source 841 emits light, for example, at a wavelength conforming to the flexible grid in the C band or the L band. Note that a wavelength of the non-modulated light generated by the light source 841 is set to a wavelength substantially coinciding with a wavelength of the non-modulated light generated by the light source 611 of the optical transceiver 610 or a wavelength of the non-modulated light generated by the light source 621 of the optical transceiver 620 shown in FIG. 2 and different from a wavelength of the non-modulated light generated by the light source 831. For example, when the wavelength of the non-modulated light generated by the light source 831 and the wavelength of the non-modulated light generated by the light source 611 are substantially matched, the wavelength of the non-modulated light generated by the light source 841 and the wavelength of the non-modulated light generated by the light source 621 are substantially matched. On the other hand, when the wavelength of the non-modulated light generated by the light source 831 and the wavelength of the non-modulated light generated by the light source 621 are substantially matched, the wavelength of the non-modulated light generated by the light source 841 and the wavelength of the non-modulated light generated by the light source 611 are substantially matched. The polarization-retaining optical coupler 842 divides the non-modulated light output from the light source 841 into two and outputs the non-modulated light to the optical modulator 845 and the coherent receiver 846. The coherent receiver 846 causes the optical signal input from the light dividing unit 860 to interfere with the non-modulated light input from the polarization-retaining optical coupler 842, performs coherent detection, and outputs an electric signal obtained by the coherent detection to the digital-signal processing unit 843. The digital-signal processing unit 843 performs digital signal processing on the electric signal input from the coherent receiver 846, compensates for distortion and the like included in a received signal, for example, wavelength dispersion, polarization fluctuation, polarization mode dispersion, carrier wave frequency offset, and carrier wave phase fluctuation, performs error correction decoding, and further deframes an OTU4 frame. The digital-signal processing unit 843 outputs the electric signal of 100 Gbit/s subjected to the digital signal processing to the electric-signal transmitting unit 820.

The electric-signal transmitting unit 820 input the electric signal output from each of the digital-signal processing units 833 and 843 to the digital-signal processing unit 813 of the optical transceiver 810.

In the optical transceiver 810, the light source 811 generates non-modulated light and outputs the non-modulated light to the polarization-retaining optical coupler 812. The light source 811 emits light, for example, at a wavelength conforming to the flexible grid in the C band or the L band. The polarization-retaining optical coupler 812 divides the non-modulated light output from the light source 811 into two and outputs the non-modulated light to the optical modulator 815 and the coherent receiver 816. The digital-signal processing unit 813 combines the electric signal input from the digital-signal processing unit 833 of the optical transceiver 830 via the electric-signal transmitting unit 820 and the electric signal input from the digital-signal processing unit 843 of the optical transceiver 840 via the electric-signal transmitting unit 820, that is, time-division multiplexes the electric signals and converts the electric signals into an OTUCn frame to thereby generate an electric signal of 200 Gbit/s. The OTUCn frame is a type of an OTU frame. The framing is performed according to the ITU-T G. 709. The digital-signal processing unit 813 further performs, on the generated electric signal, error correction encoding, mapping processing for generating a polarization multiplexing 16QAM signal, insertion of a pilot signal used for carrier wave phase slip compensation, that is, cycle slip compensation, waveform shaping by electric signal processing, and the like and outputs an electric signal obtained by performing these kinds of processing to the driver amplifier 814. In the error correction encoding, the digital-signal processing unit 813 performs encoding using, for example, a low-density parity check code having a redundancy degree of 20% or more. In this way, the digital-signal processing unit 813 modulates the electric signal in a modulation scheme different from the modulation scheme of the digital-signal processing units in the optical transmission and reception apparatus 60 configuring the A station, that is, the digital-signal processing units 613 and 623 shown in FIG. 2. Consequently, it is possible to change a modulation scheme in the optical relay apparatus 80. The driver amplifier 814 amplifies the electric signal input from the digital-signal processing unit 813 and outputs the electric signal to the optical modulator 815. The optical modulator 815 modulates the non-modulated light input from the polarization-retaining optical coupler 812 with the electric signal input from the driver amplifier 814 and outputs the non-modulated light to the sub-switch 872 of the optical switch unit 870.

The sub-switch 872 of the optical switch unit 870 performs route selection for the optical signal input from the optical modulator 815 of the optical transceiver 810 and outputs the optical signal to the transmitting unit 51 connected to the B station, which is the second communication station 20.

Consequently, the optical relay apparatus 80 can convert polarization multiplexing QPSK signal two waves having a client rate, which is a bit rate between the optical relay apparatus 80 and a client, of 100 Gb/s into polarization multiplexing 16QAM signal one wave having a client rate of 200 Gb/s. That is, the optical relay apparatus 80 can change a modulation scheme when reproducing and relaying the optical signal transmitted from the A station toward the B station.

The transmitting unit 51 transmits the optical signal output from the sub-switch 872 configuring the optical switch unit 870 of the optical relay apparatus 80 included in the reproduction and relay station 30 to the optical transmitting and receiving unit 70 in the second communication station 20. In the optical transmission and reception apparatus 70 having the configuration shown in FIG. 3, the optical signal transmitted from the reproduction and relay station 30 through the transmitting unit 51 is input to the coherent receiver 706.

In the optical transmission and reception apparatus 70, the light source 701 generates non-modulated light and outputs the non-modulated light to the polarization-retaining optical coupler 702. The light source 701 emits light, for example, at a wave length conforming to the flexible grid in the C band or the L band. Note that wavelength of the non-modulated light generated by the light source 701 is set to a wavelength substantially coinciding with the wavelength of the non-modulated light generated by the light source 811 of the optical transceiver 810 shown in FIG. 4. The polarization-retaining optical coupler 702 divides the non-modulated light output from the light source 701 into two and outputs the non-modulated light to the optical modulator 705 and the coherent receiver 706. The coherent receiver 706 causes the optical signal input from the transmitting unit 51 to interfere with the non-modulated light input from the polarization-retaining optical coupler 702, performs coherent detection, and outputs an electric signal obtained by the coherent detection to the digital-signal processing unit 703. The digital-signal processing unit 703 performs the digital signal processing on the electric signal input from the coherent receiver 706, compensates for distortion and the like included in a received signal, for example, wavelength dispersion, polarization fluctuation, polarization mode dispersion, carrier wave frequency offset, and carrier wave phase fluctuation, performs error correction decoding, and further deframes an OTUCn frame. The deframing is processing opposite to the framing performed by the digital-signal processing unit 813 of the optical transceiver 810 when generating an OTUCn frame. Consequently, electric signals of 100 Gbit/s of two systems are obtained. The digital-signal processing unit 703 outputs, to the not-shown outside, the electric signals of the two systems obtained by executing the digital signal processing on the electric signal input from the coherent receiver 706.

In this way, the optical relay apparatus 80 of the reproduction and relay station 30 can change the modulation scheme when reproducing and relaying, to the second communication station 20, the optical signal transmitted from the first communication station 10. The optical relay apparatus 80 can change a wavelength when reproducing and relaying the optical signal.

(Optical Signal Transmitting Operation from the Second Communication Station 20 to the First Communication Station 10)

An optical signal transmitting operation from the second communication station 20 to the first communication station 10 is explained. Note that the operations of the light sources and the polarization-retaining optical couplers configuring each of the first communication station 10, the second communication station 20, and the reproduction and relay station 30 are common to the "optical signal transmitting operation from the first communication station 10 to the second communication station 20" explained above. Therefore, explanation of the operations is omitted.

In the optical transceiver 700 inside the optical transmission and reception apparatus 70 configuring the B station, which is the second communication station 20 shown in FIG. 1, that is, the optical transmission and reception apparatus 70 having the configuration shown in FIG. 3, the digital-signal processing unit 703 performs digital signal processing, specifically, OTUCn framing, error correction encoding, mapping processing for generating a polarization multiplexing 16QAM signal, and the like on client signal two systems of 100 Gbit/s input from the not-shown outside. The OTUCn framing is the same processing as the OTUCn framing performed by the digital-signal processing unit 813 of the optical transceiver 810 explained above. In the error correction encoding, for example, the digital-signal processing unit 703 performs encoding using, for example, a low-density parity check code having a redundancy degree of 20% or more. In this case, a reception side performs soft decision decoding. The digital-signal processing unit 703 outputs an electric signal obtained by executing the digital signal processing on the client signal to the driver amplifier 704. The driver amplifier 704 amplifies the electric signal input from the digital-signal processing unit 703 and outputs the electric signal to the optical modulator 705. The optical modulator 705 modulates non-modulated light input from the polarization-retaining optical coupler 702 with the electric signal input from the driver amplifier 704 and outputs the non-modulated light to the transmitting unit 52 as an optical signal transmitted to the A station, which is the first communication station 10.

The transmitting unit 52 transmits, to the optical relay apparatus 80 in the reproduction and relay station 30, the optical signal output from the optical modulator 705 of the optical transmission and reception apparatus 70 included in the B station. In the optical relay apparatus 80 having the configuration shown in FIG. 4, the optical signal transmitted from the B station through the transmitting unit 52 is input to the sub-switch 871 of the optical switch unit 870.

In the optical relay apparatus 80, the sub-switch 871 of the optical switch unit 870 performs route selection for the optical signal input from the B station through the transmitting unit 52 and outputs the optical signal to the coherent receiver 816 of the optical transceiver 810.

In the optical transceiver 810, the coherent receiver 816 causes the optical signal input from the sub-switch 871 to interfere with the non-modulated light input from the polarization-retaining optical coupler 812, performs coherent detection, and outputs an electric signal obtained by the coherent detection to the digital-signal processing unit 813. The digital-signal processing unit 813 performs digital signal processing on the electric signal input from the coherent receiver 816, compensates for distortion and the like included in a received signal, for example, wavelength dispersion, polarization fluctuation, polarization mode dispersion, carrier wave frequency offset, and carrier wave phase fluctuation, performs error correction decoding, and further deframes an OTUCn frame. As a result, electric signals of 100 Gb/s of two systems are obtained. The digital-signal processing unit 813 outputs, to the electric-signal transmitting unit 820, the electric signals of the two systems obtained by executing the digital signal processing on the electric signal input from the coherent receiver 816.

The electric-signal transmitting unit 820 inputs, to the digital-signal processing unit 833 of the optical transceiver 830, one of the electric signals of the two systems output from the digital-signal processing unit 813 and inputs the other to the digital-signal processing unit 843 of the optical transceiver 840.

In the optical transceiver 830, the digital-signal processing unit 833 converts the electric signal input from the digital-signal processing unit 813 of the optical transceiver 810 via the electric-signal transmitting unit 820 into an OTU4 frame. The digital-signal processing unit 833 further performs, on the electric signal after the OTU4 framing, error correction encoding, mapping processing for generating a polarization multiplexing QPSK signal, insertion of a pilot signal used for carrier wave phase slip compensation, that is, cycle slip compensation, waveform shaping by electric signal processing, and the like and outputs an electric signal obtained by performing these kinds of processing to the driver amplifier 834. In the error correction encoding, the digital-signal processing unit 833 performs encoding using, for example, a low-density parity check code having a redundancy degree of 20% or more. In this way, the digital-signal processing unit 833 modulates the electric signal in a modulation scheme different from the modulation scheme of the digital-signal processing unit in the optical transmission and reception apparatus 70 configuring the B station, that is, the digital-signal processing unit 703 shown in FIG. 3. Consequently, it is possible to change a modulation scheme in the optical relay apparatus 80. The driver amplifier 834 amplifies the electric signal input from the digital-signal processing unit 833 and outputs the electric signal to the optical modulator 835. The optical modulator 835 modulates the non-modulated light input from the polarization-retaining optical coupler 832 with the electric signal input from the driver amplifier 834 and outputs the non-modulated light to the optical multiplexing unit 850 as an optical signal relayed to the A station.

The optical transceiver 840 executes the same procedure as the procedure of the optical transceiver 830 on the electric signal input from the digital-signal processing unit 813 of the optical transceiver 810 via the electric-signal transmitting unit 820 and generates an optical signal relayed to the A station.

The optical multiplexing unit 850 multiplexes the optical signal input from each of the optical transceivers 830 and 840 and outputs the optical signal to the sub-switch 872 of the optical switch unit 870.

The sub-switch 872 of the optical switch unit 870 performs route selection for the optical signal input from the optical multiplexing unit 850 and outputs the optical signal to the transmitting unit 42 connected to the A station.

Consequently, the optical relay apparatus 80 can convert polarization multiplexing 16QAM signal one wave having a client rate of 200 Gbit/s into polarization multiplexing QPSK signal two waves having a client rate of 100 Gbit/s. That is, the optical relay apparatus 80 can change a modulation scheme when reproducing and relaying the optical signal transmitted from the B station toward the A station.

The transmitting unit 42 transmits the optical signal output from the sub-switch 872 configuring the optical switch unit 870 of the optical relay apparatus 80 included in the reproduction and relay station 30 to the optical transmission and reception apparatus 60 in the A station.

In the optical transmission and reception apparatus 60 having the configuration shown in FIG. 2, the optical signal transmitted from the reproduction and relay station 30 through the transmitting unit 42 is input to the optical diving unit 640. The optical dividing unit 640 divides the optical signal input from the transmitting unit 42 using, for example, a 1-to-2 optical coupler, a power ratio of which is 1:1, and outputs the optical signal to the coherent receiver 616 of the optical transceiver 610 and the coherent receiver 626 of the optical transceiver 620.

In the optical transceiver 610, the coherent receiver 616 causes the optical signal input from the optical dividing unit 640 to interfere with the non-modulated light input from the polarization-retaining optical coupler 612, performs coherent detection, and outputs an electric signal obtained by the coherent detection to the digital-signal processing unit 613. The digital-signal processing unit 613 performs digital signal processing on the electric signal input from the coherent receiver 616, compensates for distortion and the like included in a received signal, for example, wavelength dispersion, polarization fluctuation, polarization mode dispersion, carrier wave frequency offset, and carrier wave phase fluctuation, performs error correction decoding, and further deframes an OTU4 frame. As a result, an electric signal of 100 Gb/s is obtained. The digital-signal processing unit 613 outputs, to the not-shown outside, the electric signal obtained by executing the digital signal processing on the electric signal input from the coherent receiver 616.

In the optical transceiver 620, the coherent receiver 626 causes the optical signal input from the optical dividing unit 640 to interfere with the non-modulated light input from the polarization-retaining optical coupler 622, performs coherent detection, and outputs an electric signal obtained by the coherent detection to the digital-signal processing unit 623. The digital-signal processing unit 623 performs digital signal processing on the electric signal input from the coherent receiver 626, compensates for distortion and the like included in a received signal, for example, wavelength dispersion, polarization fluctuation, polarization mode dispersion, carrier wave frequency offset, and carrier wave phase fluctuation, performs error correction decoding, and further deframes an OTU4 frame. As a result, an electric signal of 100 Gb/s is obtained. The digital-signal processing unit 623 outputs, to the not-shown outside, the electric signal obtained by executing the digital signal processing on the electric signal input from the coherent receiver 626.

In this way, the optical relay apparatus 80 of the reproduction and relay station 30 can change the modulation scheme when reproducing and relaying, to the first communication station 10, the optical signal transmitted from the second communication station 20. The optical relay apparatus 80 can change a wavelength when reproducing and relaying the optical signal.

In the above explanation, the optical relay apparatus 80 of the reproduction and relay station 30 converts the polarization multiplexing QPSK signal two waves transmitted from the first communication station 10 into the polarization multiplexing 16QAM signal one wave and transmits the polarization multiplexing 16QAM signal one wave to the second communication station 20 and converts the polarization multiplexing 16QAM one wave transmitted from the second communication station 20 into the polarization multiplexing QPSK signal two waves and transmits the polarization multiplexing QPSK signal two waves to the first communication station 10. In a case opposite to this, that is, when the first communication station 10 connected via the transmitting units 41 and 42 is configured to transmit and receive the polarization multiplexing 16QAM signal one wave and the second communication station 20 connected via the transmitting units 51 and 52 is configured to transmit and receive the polarization multiplexing QPSK signal two waves, the optical relay apparatus 80 is adaptable to the case by changing the setting of the optical switch unit 870.

Figure 5:
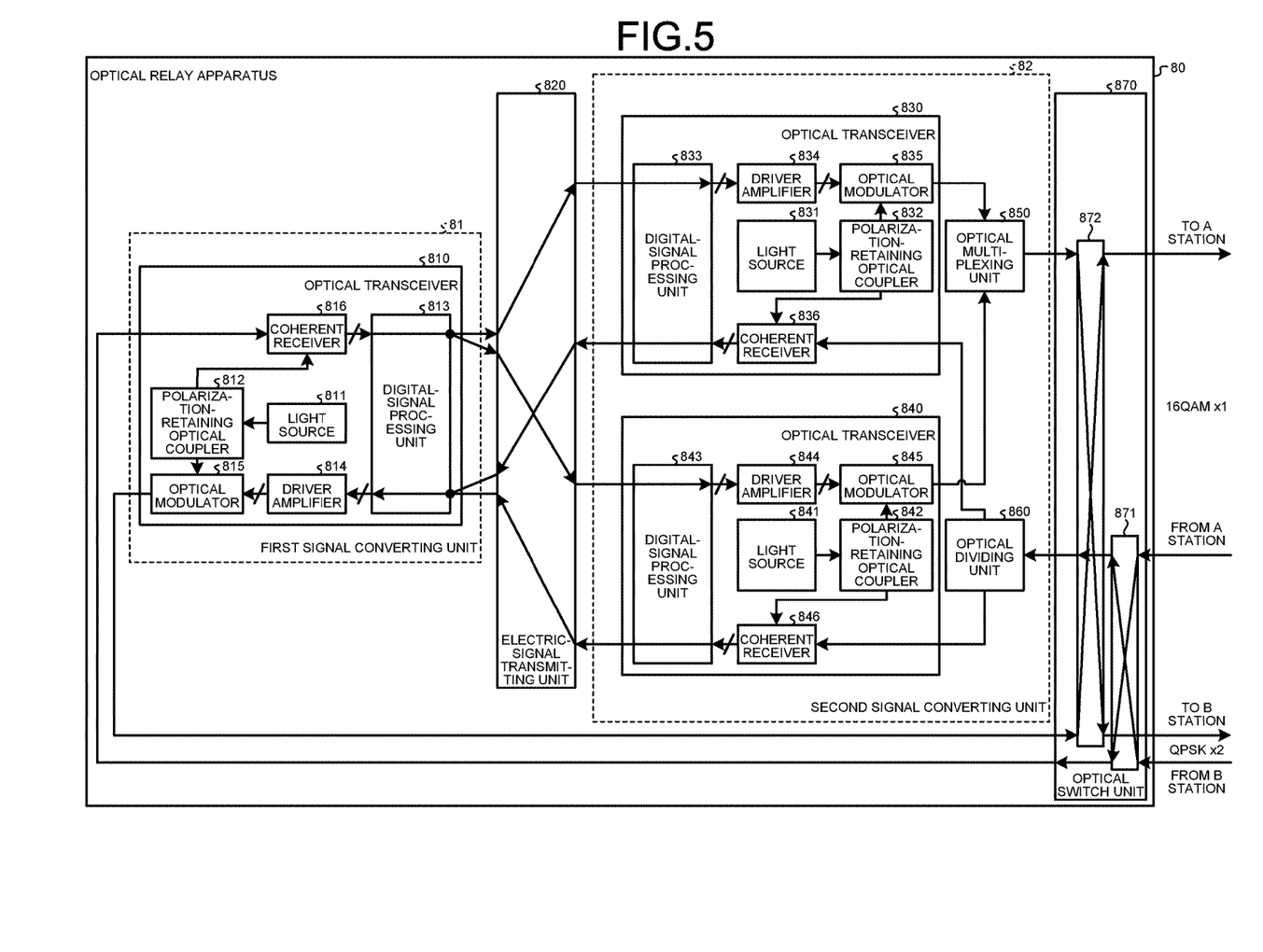
FIG. 5 is a diagram showing a setting example of an optical switch unit included in the optical relay apparatus according to the embodiment.

FIG. 5 is a diagram showing an example in which the setting of the sub-switches 871 and 872 of the optical switch unit 870 is changed compared with FIG. 4.

In the example shown in FIG. 5, the sub-switch 871 of the optical switch 87 receives the optical signal output from the A station and inputs the optical signal to the coherent receiver 816 of the optical transceiver 810 and receives the optical signal output from the B station 20 and inputs the optical signal to the optical dividing unit 860. The sub-switch 872 of the optical switch unit 870 receives the optical signal output from the optical modulator 815 of the optical transceiver 810 and outputs the optical signal toward the A station and receives the optical signal output from the optical multiplexing unit 850 and outputs the optical signal toward the B station.

In this way, the optical relay apparatus 80 of the reproduction and relay station 30 can set the optical signal between the optical relay apparatus 80 and the A station as the polarization multiplexing 16QAM and set the signal between the optical relay apparatus 80 and the B station as the polarization multiplexing QPSK.

Figure 6:
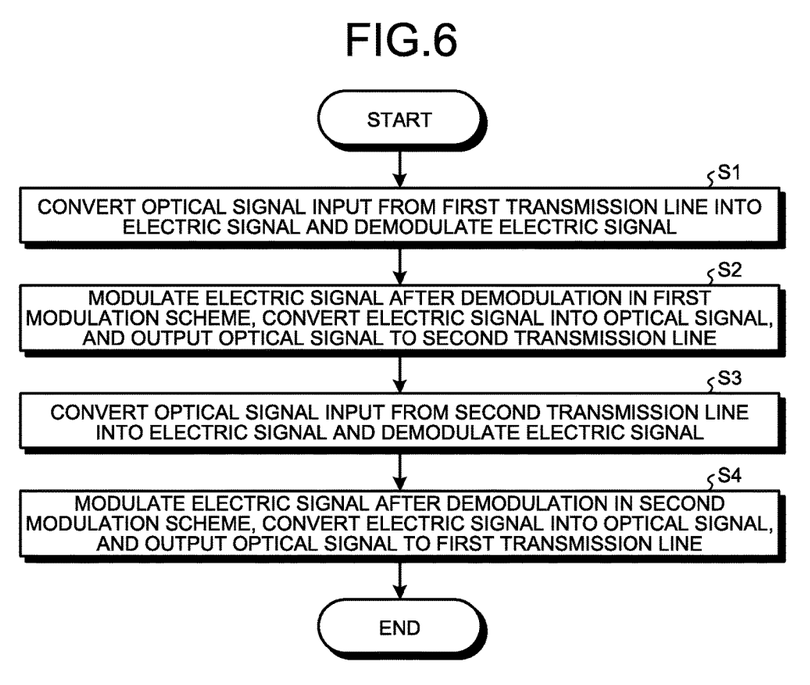
FIG. 6 is a flowchart showing operation in which the optical relay apparatus according to the embodiment reproduces and relays an optical signal between an A station and a B station.

FIG. 6 is a flowchart showing operation in which the optical relay apparatus 80 of the reproduction and relay station 30 reproduces and relays an optical signal between the A station and the B station.

When an optical signal is input from a first transmission line to which one of the A station and the B station is connected, the optical relay apparatus 80 converts the input optical signal into an electric signal and demodulates the electric signal (step S1). Subsequently, the optical relay apparatus 80 modulates the electric signal after the demodulation in the first modulation scheme, converts the electric signal into an optical signal, and outputs the optical signal to a second transmission line to which the other of the A station and the B station is connected (step S2). When an optical signal is input from the second transmission line, the optical relay apparatus 80 converts the input optical signal into an electric signal and demodulates the electric signal (step S3). Subsequently, the optical relay apparatus 80 modulates the electric signal after the demodulation in the second modulation scheme, converts the electric signal into an optical signal, and outputs the optical signal to the first transmission line (step S4). Steps S1 and S2 are a first relay step. Steps S3 and S4 are a second relay step.

When a connection relation among the A station, the B station, and the optical relay apparatus 80 is a connection relation shown in FIG. 4, for example, at steps S1 and S2 explained above, the optical relay apparatus 80 converts the polarization multiplexing QPSK optical signal output from the A station into the polarization multiplexing 16QAM optical signal and outputs the polarization multiplexing 16QAM optical signal toward the B station. At steps S3 and S4, the optical relay apparatus 80 converts the polarization multiplexing 16QAM optical signal output from the B station into the polarization multiplexing QPSK optical signal and outputs the polarization multiplexing QPSK optical signal and outputs the polarization multiplexing QPSK optical signal toward the A station. In this case, the first modulation scheme is 16QAM and the second modulation scheme is QPSK.

When the connection relation among the A station, the B station, and the optical relay apparatus 80 is a connection relation shown in FIG. 5, for example, at steps S1 and S2 explained above, the optical relay apparatus 80 converts the polarization multiplexing 16QAM optical signal into the polarization multiplexing QPSK optical signal and outputs the polarization multiplexing QPSK optical signal toward the B station. At steps S3 and S4, the optical relay apparatus 80 converts the polarization multiplexing QPSK optical signal output from the B station into the polarization multiplexing 16QAM optical signal and outputs the polarization multiplexing 16QAM optical signal toward the A station. As a result, the first modulation scheme is QPSK and the second modulation scheme is 16QAM.

Note that, when reproducing and relaying the optical signal, the optical relay apparatus 80 in this embodiment performs the modulation scheme conversion between the polarization multiplexing QPSK signal two waves having the client rate of 100 Gbit/s and the polarization multiplexing 16QAM signal one wave having the client rate of 200 Gbit/s. However, the optical relay apparatus 80 is not limited to this. In the case of the configuration shown in FIG. 4, in conversion between one wave to two waves, the optical relay apparatus 80 can perform, for example, conversion between BPSK and QPSK and conversion between 8QAM and 64QAM. These conversions can be realized by changing the digital signal processing executed by the digital-signal processing units 813, 833, and 843 shown in FIG. 4. The optical relay apparatus 80 can also be applied to a more generalized configuration, that is, conversion of an optical signal having a multi-level degree of m [bit/symbol] and a wavelength number of M [waves] and an optical signal having a multi-value degree of n [bit/symbol] and a wavelength number of N [waves] by changing the configuration of the optical relay apparatus 80, specifically, the number of optical transceivers included in the first signal converting unit 81 and the number of optical transceivers included in the second signal converting unit 82 and changing the setting of the electric-signal transmitting unit 820. It is assumed that m, M, n, and N are natural numbers. Note that, when a symbol rate is set common, m, M, n, and N need to satisfy mM=nN.

A line rate, which is a bit rate on a transmitting unit side, including a redundancy degree such as a frame overhead, an error correction code parity, and use in carrier wave phase slip compensation is set to, for example, 130 Gbit/s in the case of the polarization multiplexing QPSK and is set to, for example, 260 Gbit/s in the case of the polarization multiplexing 16QAM. The redundancy degree can also be set differently in the case of the polarization multiplexing QPSK and the case of the polarization multiplexing 16QAM.

For example, as a client signal having a transmission capacity of 100 Gbit/s, 100 GbE or OTU4 is used. In this case, as a form of a frame used in a section in which optical transmission is performed, that is, a section between the first communication station 10 and the reproduction and relay station 30 and a section between the preproduction and relay station 30 and the second communication station 20, an OTU4 frame capable of storing a 100 Gbit/s signal or an OTUCn frame capable of storing a multiple of the 100 Gbit/s signal is used.

In the optical transmission system in this embodiment, it is assumed that a symbol rate per channel is mainly set in a range of 1 G symbol/s to 100 G symbol/s and used. However, the present invention does not limit the symbol rate to the range. It is also possible to mix signals having different symbol rates among a plurality of channels.

As explained above, in the optical transmission system according to this embodiment, the optical relay apparatus 80 includes the first signal converting unit 81 and the second signal converting unit 82. The first signal converting unit 81 converts the optical signal output from the first communication station 10 or the second communication station into an electric signal and demodulates the electric signal and outputs the electric signal to the second signal converting unit 82 side and modulates the electric signal input from the second signal converting unit 82 side in the first modulation scheme and converts the electric signal into the optical signal and outputs the optical signal to the first communication station 10 or the second communication station 20. The second signal converting unit 82 modulates the electric signal output from the first signal converting unit 81 in the second modulation scheme and converts the electric signal into an optical signal and outputs the optical signal to the second communication station 20 or the first communication station 10 and converts the optical signal output from the second communication station 20 or the first communication station 10 into an electric signal and demodulates the electric signal and outputs the electric signal to the first signal converting unit 81 side. Consequently, the optical relay apparatus 80 can change the modulation scheme when reproducing and relaying the optical signal.

The optical transceivers 810, 830, and 840 included in the optical relay apparatus 80 are configured to use common non-modulated light in a reception system and a transmission system of an optical signal. Therefore, it is possible to reduce light sources mounted on the optical transceivers to one. It is possible to realize a reduction in cost. On the other hand, even if the optical transceivers are configured to use the common non-modulated light in the reception system and the transmission system of the optical signal, the optical relay apparatus 80 can convert a wavelength in reproduction and relay of the optical signal. Therefore, with the optical relay apparatus 80, it is possible to realize, at low cost, reproduction and relay capable of converting both of the modulation scheme and the wavelength.

Because the optical relay apparatus 80 includes the optical switch unit 870, it is possible to change a direction of modulation scheme conversion without changing connection of an optical interface. It is possible to realize an optical transmission system that can be flexibly operated.

The configurations explained in the embodiment above indicate an example of the contents of the present invention and can be combined with other publicly-known technologies or a part of the configurations can be omitted or changed in a range not departing from the spirit of the present invention.

REFERENCE SIGNS LIST

10 first communication station
20 second communication station
30 reproduction and relay station
41, 42, 51, 52 transmitting unit
60, 70 optical transmission and reception apparatus
80 optical relay apparatus
81 first signal converting unit
82 second signal converting unit
610, 620, 700, 810, 830, 840 optical transceiver
611, 621, 701, 811, 831, 841 light source
612, 622, 702, 812, 832, 842 polarization-retaining optical coupler
613, 623, 703, 813, 833, 843 digital-signal processing unit
614, 624, 704, 814, 834, 844 driver amplifier
615, 625, 705, 815, 835, 845 optical modulator
616, 626, 706, 816, 836, 846 coherent receiver
630, 850 optical multiplexing unit
640, 860 optical dividing unit
820 electric-signal transmitting unit
870 optical switch unit
871, 872 sub-switch

The invention claimed is:

1. An optical repeater comprising:
a first signal converter to convert a received optical signal into an electric signal, demodulate and output the electric signal, and modulate an input electric signal in a first modulation scheme and convert the electric signal into an optical signal and transmit the optical signal; and
a second signal converter to modulate the electric signal output from the first signal converter in a second modulation scheme and convert the electric signal into an optical signal and transmit the optical signal, and convert a received optical signal into an electric signal, demodulate the electric signal, and output the electric signal as an electric signal input to the first signal converter;
further comprising an optical switcher to perform first switch processing for inputting, to the first signal converter, an optical signal output from a first communication circuit and outputting an optical signal output from the first signal converter toward the first communication circuit and inputting, to the second signal converter, an optical signal output from a second communication circuit and outputting an optical signal output from the second signal converter toward the second communication circuit or second switch processing for inputting, to the first signal converter, the optical signal output from the second communication circuit and outputting the optical signal output from the first signal converter toward the second communication circuit and inputting, to the second signal converter, the optical signal output from the first communication circuit and outputting the optical signal output from the second signal converter toward the first communication circuit.

2. The optical repeater according to claim 1, wherein when m, M, n, and N are natural numbers,
the optical signal input to the first signal converter and the optical signal output from the first signal converter are set as an optical signal, a multi-level degree of which is m and a wavelength number of which is M, and
the optical signal input to the second signal converter and the optical signal output by the second signal converter are set as an optical signal, a multi-level degree of which is n and a wavelength number of which is N.

3. The optical repeater according to claim 2, wherein the m, M, n, and N satisfy mM=nN.

4. The optical repeater according to claim 2, wherein
the first signal converter includes M optical transceivers that, when an optical signal, a multi-level degree of which is m, is input, converts the optical signal into an electric signal and outputs the electric signal and, when an electric signal is input, converts the electric signal into an optical signal, a multi-level degree of which is m, and outputs the optical signal, and
the second signal converter includes N optical transceivers that, when an optical signal, a multi-level degree of which is n, is input, converts the optical signal into an electric signal and outputs the electric signal and, when an electric signal is input, converts the electric signal into an optical signal, a multi-level degree of which is n, and outputs the optical signal.

5. The optical repeater according to claim 4, wherein each of M optical transceivers included in the first signal converter and each of N optical transceivers included in the second signal converter include one light source and use non-modulated light generated by the one light source in both of processing for converting an optical signal into an electric signal and processing for converting an electric signal into an optical signal.

6. The optical repeater according to claim 4, wherein
an optical signal output from each of M optical transceivers included in the first signal converter is an optical signal modulated in a polarization multiplexing quaternary phase-shift keying scheme,
an optical signal output from each of N optical transceivers included in the second signal converter is an optical signal modulated in a polarization multiplexing hexadecimal quadrature amplitude modulation scheme, and
the M and N are in a relation of M=2N.

7. The optical repeater according to claim 4, wherein each of M optical transceivers included in the first signal converter and each of the N optical transceivers included in the second signal converter include:

a light emitter to generate non-modulated light;
a polarization-retaining optical coupler to divide the non-modulated light generated by the light source into two;
a coherent receiver to perform coherent detection using one of the non-modulated lights after the input optical signal is divided into two by the polarization-retaining optical coupler;
a digital-signal processor to demodulate an electric signal obtained by the coherent receiver executing the coherent detection and output the electric signal to an outside and modulate the electric signal input from the outside and output the electric signal to the outside;
a driver amplifier to amplify the electric signal after the modulation output from the digital-signal processor; and
an optical modulator to modulate the other of the non-modulated lights after being divided into two by the polarization-retaining optical coupler using the electric signal after being modulated by the driver amplifier and output the non-modulated light to the outside.

* * * * *